Patented Mar. 26, 1935

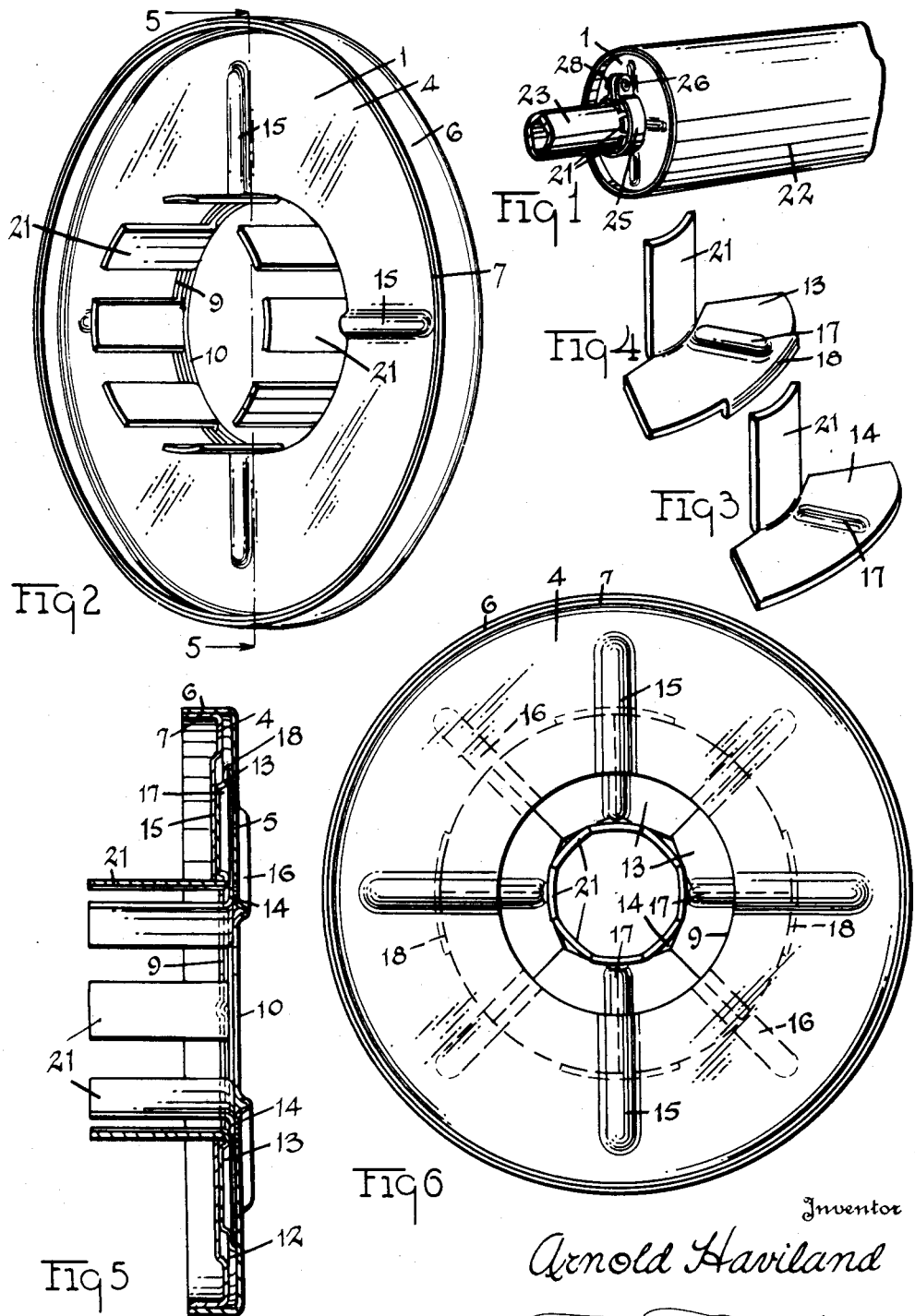

1,995,542

UNITED STATES PATENT OFFICE 1,995,542

UNIVERSAL MUFFLER COUPLING

Arnold Haviland, Defiance, Ohio

Application November 22, 1933, Serial No. 699,112

2 Claims. (Cl. 285—183)

The object of my invention is to provide a universal coupling whereby a pipe, such as an exhaust pipe, may be coupled to an internal combustion engine muffler or other similar drum shaped member.

One of the particular objects of my invention is to provide a muffler coupling so constructed as to form a gas tight, leak proof construction at the point of interjointure of the pipe and the muffler and enable the use of the muffler in conjunction with pipes of different diameters, and consequently render the coupling universal in character.

The universal coupling of my invention provides efficient means for coupling exhaust and tail pipes to mufflers to produce a gas tight interjointure regardless of the diameter of the exhaust or tail pipe.

The muffler coupling of my invention is of particular commercial value in muffler assembly, since it provides means that enables ready assembly of the mufflers having the coupling in conjunction with engines employing exhaust and tail pipes of different diameters, and may be coupled to the muffler with a minimum expenditure of time and effort.

The invention consists in other features and advantages which will appear from the following description and upon examination of the drawing. Structures containing the invention may partake of different forms and still embody the invention. To illustrate a practical application of the invention, I have selected a muffler coupling as an example of the various structures and details thereof that contain the invention and shall describe the selected muffler coupling hereinafter, it being understood that variations may be made without departing from the spirit of the invention. The particular muffler coupling selected is shown in the accompanying drawing and described hereinafter.

Fig. 1 illustrates the end part of the muffler and shows the exhaust pipe coupled to the muffler by means of the universal muffler coupling of my invention. Fig. 2 is a perspective view of the muffler coupling. Fig. 3 illustrates one of the radially slideable sectors shown in Fig. 2. Fig. 4 illustrates another of the radially slideable sectors shown in Fig. 2. Fig. 5 is a cross-section taken on the line 5—5 in Fig. 2. Fig. 6 is a front view of the coupling and shows an adjustment of the radially slideable sectors.

The particular coupling selected as an example of an embodiment of my invention provides a pair of annular disc members, one of the disc members being positioned within the other in nesting relation. The discs are maintained in position relative to each other by peripheral, flanged portions formed integral with the discs and are positioned so as to form a housing in which is positioned a plurality of radially slideable, arcuate sectors. The sectors may be radially adjusted to form an opening of a diameter which substantially conforms to the diameter of the pipe to be coupled to the muffler. The sectors are provided with protruding portions that engage the pipe and are adapted to receive a suitable clamping member, such as a split collar, whereby the adjustment of the sectors may be maintained and produce a sealed connection between the muffler and the pipe.

In the construction shown in the drawing, the universal muffler coupling 1 is composed of annular discs 4 and 5. The disc 5 is provided with flanged, peripheral portions 6 and is adapted to receive the disc 4 in nesting relationship within the limitations of the flanged portions 6. The disc 4 is provided with flanged, peripheral portions 7 which are frictionally engaged by the flanged portions 6 of the disc 5 and operate to maintain the discs 4 and 5 in their nesting relation. The discs 4 and 5 have openings 9 and 10 respectively, which are preferably central and of substantially the same diameter and are located in substantial registration with each other when the discs are located in nesting relation.

The discs form a housing 12 adapted to receive a plurality of radially slideable, arcuate sectors 13 disposed between the discs. In order that the radially slideable sectors may be maintained in their radial relationship to the discs, the discs 4 and 5 are provided with radially extending grooves, and the sectors are provided with ridges that register with and fit the grooves of the discs. Thus the disc 4 is provided with the grooves 14, and the disc 5 is provided with similar grooves 15. Slideable, arcuate sectors 13 and 14 are provided with ridge portions 17 adapted to fit in the grooves 15 and 16 of the discs 4 and 5, which enables radial movement of the sectors and maintains them in constant angular relation to each other and to the discs. Each of the sectors 13 is provided with a depending flanged portion 18 formed integral with the arcuate sector and preferably having dimensions such that the edge of the flanged portion 18 abuts and slidably engages the surface of the disc 5 when the sectors are disposed between the discs 4 and 5 in the housing 12.

It is apparent, therefore, that the slideable sectors 13 may be moved inwardly and outwardly with respect to the openings 9 and 10 of the discs 4 and 5 respectively to vary the size of the opening while maintaining the opening substantially circular, due to the arcuate shape of the radially slideable sectors, and thus form a gas tight, leak proof coupling between the muffler and the exhaust or tail pipe. The gas tight, leak proof construction is further assured by the depending portions 18 of the sectors 13, since the abutment of the flanged portions with the disc 5 prevents the flow of gas through the grooves 15 between the discs 4 and 5, and out through the grooves 16.

Each of the radially slideable sectors 13 and 14 is provided with a protruding cylindrical portion 21 formed integral with the sector and extending at right angles to the sector. The protruding cylindrical portions 21 are adapted to fit over the end portions of the pipe which is coupled with the muffler and are so formed as to conform to the cylindrical surfaces of the pipe. The protruding portions 21 may be suitably clamped, such as by a split collar, to maintain the adjustment of the sectors and to clamp the protruding portions rigidly to the pipe.

In assembling the muffler and connecting to it the exhaust pipe or tail pipe, a muffler coupling is secured in each end of the muffler 22 by welding, and if desired, the flanges 6 and 7 of the discs 4 and 5 may also be spot welded to each other. The parts of the exhaust or tail pipe 23 are then positioned in the openings of the discs that form the heads of the muffler, and the slideable sectors 13 and 14 are adjusted radially to form an opening of substantially the same cross-sectional area as that of the exhaust or tail pipe. The cylindrical portions 21 form a collar which engages the outer cylindrical surfaces of the exhaust or tail pipe, and the protruding portions are maintained in rigid and frictional engagement thereon by a suitable split collar 25 and a bolt 26 and nut 28 that clamp the protruding portions 21 to the pipe 23 and maintain the exhaust or tail pipe rigidly in its coupled relation with the muffler.

I claim:

1. In a universal muffler coupling, a muffler pipe, a pair of disc members forming the muffler head and having registering openings, a plurality of arcuate sectors interposed between the disc members and supported in overlapping relationship, the alternate sectors having raised ridges extending radially and protruding towards one disc member, the intermediate sectors having radially extending ridges and protruding toward the other disc member, the disc members having radially extending grooves for receiving the radially extending ridges of the said sectors for radially slideably maintaining the sectors in overlapping and constant angular spaced relation, the sectors operable by reason of their slideable relationship to vary the size of the said openings when moved radially, the sectors having outwardly extending flange parts for engagement of the surface of a connecting pipe and means for clamping the flange parts against the surface of the said pipe.

2. In a universal muffler coupling, a muffler pipe, a pair of disc members forming the muffler head and having registering openings, a plurality of arcuate sectors interposed between the disc members and supported in overlapping relationship, the alternate sectors having raised ridges extending radially and protruding towards one disc member, the intermediate sectors having radially extending ridges and protruding toward the other disc member, the disc members having radially extending grooves for receiving the radially extending ridges of the said sectors for radially slideably maintaining the sectors in overlapping and constant angular spaced relation, the sectors operable by reason of their slideable relationship to vary the size of the said openings when moved radially, the outer sectors contiguous to the outer of the said discs with respect to the muffler having lips protruding inwardly to substantially cover the spaces between the sectors contiguous to the inner of the said discs and operable to overlap edge portions of contiguous inner sectors, the sectors having outwardly extending flange parts for engagement of the surface of a connecting pipe and means for clamping the flange parts against the surface of the said pipe.

ARNOLD HAVILAND.